(12) United States Patent
Handa (10) Patent No.: US 12,025,279 B2
(45) Date of Patent: Jul. 2, 2024

(54) GAS FILLING METHOD

(71) Applicant: Honda Motor Co., Ltd., Tokyo (JP)

(72) Inventor: Kiyoshi Handa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/982,490

(22) Filed: Nov. 7, 2022

(65) Prior Publication Data

US 2023/0204158 A1 Jun. 29, 2023

(30) Foreign Application Priority Data

Dec. 28, 2021 (CN) .......................... 202111623392.3

(51) Int. Cl.
*F17C 5/06* (2006.01)
*F17C 13/02* (2006.01)

(52) U.S. Cl.
CPC .......... *F17C 5/06* (2013.01); *F17C 2221/012* (2013.01); *F17C 2223/0123* (2013.01);
(Continued)

(58) Field of Classification Search
CPC ........ F17C 2250/0439; F17C 2260/026; F17C 2250/0694; F17C 13/02; F17C 5/06; F17C 2221/012; F17C 2223/0123; F17C 2227/048; F17C 2250/032; F17C 2250/0434; F17C 2250/0636;
(Continued)

(56) References Cited

U.S. PATENT DOCUMENTS

| 8,522,834 B2* | 9/2013 | Okawachi | F17C 5/00 |
| | | | 141/2 |
| 8,708,005 B2* | 4/2014 | Mori | F17C 5/007 |
| | | | 141/94 |

(Continued)

FOREIGN PATENT DOCUMENTS

| JP | 2011153681 A | * | 8/2011 | ............. F17C 5/007 |
| WO | 2020007521 | | 1/2020 | |
| WO | WO-2020007521 A1 | * | 1/2020 | ................ F17C 5/06 |

OTHER PUBLICATIONS

JP-2011153681-A English Translation of Specification (Year: 2023).*
(Continued)

*Primary Examiner* — Timothy P. Kelly
*Assistant Examiner* — Stephanie A Shrieves
(74) *Attorney, Agent, or Firm* — JCIPRNET (57) ABSTRACT

The disclosure provides a gas filling method. The gas filling method includes the following steps: an effective heat mass calculation step, which uses the heat capacity of the piping and the detection value of the gas temperature sensor to calculate the value of the effective heat mass related to the temporary pressure loss caused by the piping before gas-filling is started; a pressure loss parameter calculation step, which uses the detection value of the pressure sensor when the flow rate of the gas in the piping changes to calculate the value of the pressure loss parameter related to the pressure loss caused by the piping after the gas-filling is started; and a filling condition changing step, which changes the filling condition into a condition that is defined based on the value of the pressure loss parameter and gas-filling is continued.

12 Claims, 7 Drawing Sheets

(52) U.S. Cl.
CPC .. *F17C 2227/048* (2013.01); *F17C 2250/032* (2013.01); *F17C 2250/0434* (2013.01); *F17C 2250/0439* (2013.01); *F17C 2250/0636* (2013.01); *F17C 2250/072* (2013.01); *F17C 2265/065* (2013.01); *F17C 2270/0139* (2013.01)

(58) Field of Classification Search
CPC .......... F17C 2250/072; F17C 2265/065; F17C 2270/0139; Y02E 60/32
USPC .......................................................... 141/4
See application file for complete search history.

(56) References Cited

U.S. PATENT DOCUMENTS

| | | | | |
|---|---|---|---|---|
| 8,783,303 | B2* | 7/2014 | Harty | F17C 13/025 141/2 |
| 9,222,620 | B2* | 12/2015 | Harty | F17C 13/023 |
| 10,077,998 | B2* | 9/2018 | Mathison | F17C 5/06 |
| 10,704,737 | B2* | 7/2020 | Bourgeois | F17C 13/023 |
| 2015/0184804 | A1* | 7/2015 | Handa | F17C 5/06 141/1 |
| 2015/0377416 | A1* | 12/2015 | Miyoshi | F17C 13/025 141/95 |
| 2016/0305611 | A1* | 10/2016 | Handa | F17C 5/06 |
| 2017/0074456 | A1* | 3/2017 | Handa | F17C 1/005 |
| 2019/0301678 | A1* | 10/2019 | Yamaguchi | F17C 13/025 |

OTHER PUBLICATIONS

Kiyoshi Handa et al., "Development of MC Formula Hydrogen Refueling Method for FCV," Collection of Preparatory Manuscripts for the Academic Lecture at the 2015 Autumn Conference of the Automotive Technology Association, Jul. 2015, with English Abstract, pp. 1-6.

"Fueling Protocols for Light Duty Gaseous Hydrogen Surface Vehicles," SAE J2601-2020, May 2020, pp. 1-293.

"Search Report of Europe Counterpart Application", issued on May 30, 2023, pp. 1-6.

\* cited by examiner

GAS FILLING METHOD

CROSS-REFERENCE TO RELATED APPLICATION

This application claims the priority benefit of China application no. 202111623392.3, filed on Dec. 28, 2021. The entirety of the above-mentioned patent application is hereby incorporated by reference herein and made a part of this specification.

BACKGROUND

Technical Field

The present disclosure relates to a gas filling method. More specifically, the present disclosure relates to a gas filling method in which a supply source of compressed gas is connected to a tank mounted on a movable body by piping, and the tank of the movable body is filled with gas.

Description of Related Art

In recent years, with the restriction of regulations for emissions from vehicle and $CO_2$/fuel efficiency, it is required to simultaneously achieve cleaning of engine emission and improvement of fuel consumption efficiency. Construction of safe cities and people's residence is reinforced in all countries to strengthen the capacity of all countries for inclusive and sustainable urban development, sustainable people's residence planning and management. Therefore, in all countries, there is a need to reinforce services in providing safe, affordable, accessible and sustainable transport systems for all people to improve road safety. Especially, there is a need to increase public transport, and reduce the per capita negative environmental impact of cities, including paying special attention to air quality and municipal waste management, etc. In the field of transportation, in the manufacturing of vehicles, there is an urgent need to take steps to address environmental concerns in order to develop technologies that can increase the improvement rate in global energy efficiency.

A fuel cell vehicle travels by supplying oxygen-containing air and fuel gas, that is, hydrogen gas, to the fuel cell, and driving an electric motor with electric power generated thereby. In recent years, fuel cell vehicles using such a fuel cell as an energy source for generating power have been adopted in practical use. For fuel cell, generating power requires hydrogen gas, but in fuel cell vehicles that have been developed recently, it has become mainstream to pre-store a sufficient amount of hydrogen gas in a hydrogen tank equipped with a high-pressure tank or a storage alloy, and the hydrogen gas in the tank is utilized for driving. Moreover, correspondingly, many studies have been conducted on a filling technique for rapidly filling a tank with as much hydrogen gas as possible at a hydrogen station.

Hydrogen gas in the tank heats up due to compression. Therefore, in recent years, in order to suppress the temperature rise in the tank during hydrogen filling, the mainstream technique is to cool the hydrogen gas to, for example, about −40° C. using a precooler arranged in the hydrogen gas flow path. In this way, the temperature of hydrogen gas is lowered by the precooler, so that the temperature rise of the hydrogen gas in the tank is able to be suppressed as well, and therefore the filling of the hydrogen gas is able to be accelerated accordingly.

For example, Non-Patent Document 1 (Kiyoshi HANDA, Steve Mathison, Development of a hydrogen filling method for FCV using MC formula, *Collection of Preparatory Manuscripts for the Academic Lecture at the* 2015 *Autumn Conference of the Automotive Technology Association*) shows a filling method in which the pressure increase rate during the filling period can be changed with filling of hydrogen gas based on a specific equation. In the filling method described in Non-Patent Document 1, a polynomial of a temperature parameter obtained by performing a mass averaging process on the detected value of a temperature sensor provided on the downstream side of a precooler in a hydrogen gas flow channel is used to express an equation for defining the pressure increase rate, and a value of the coefficient of each order of the temperature parameter is determined based on maps (see Non-Patent Document 1). Furthermore, in the filling method described in Non-Patent Document 1, a plurality of such maps are prepared, an appropriate map corresponding to the tank capacity and the initial pressure of the tank is selected from the plurality of maps, and the selected map is used to determine values for multiple coefficients.

However, when filling with hydrogen gas, since the hydrogen gas flows through the piping connecting the accumulator of the hydrogen station and the hydrogen tank of the vehicle, a considerable pressure loss occurs, and the temperature of the hydrogen gas in the tank rises accordingly. Therefore, in the above-mentioned filling methods, the map for determining the pressure increase rate is constructed in anticipation of the existence of such a pressure loss. In addition, the pressure loss actually generated during filling varies depending on various factors such as the shape of the piping on the station side, the shape of the piping on the vehicle side, and the state of the dust filter inserted into the piping. However, in the conventional filling methods, it is impossible to estimate the pressure loss that actually occurs when filling hydrogen gas. Therefore, the multiple maps used to determine the pressure increase rate as described above are those constructed to anticipate the maximum pressure loss among the expected pressure loss.

In this way, in the conventional filling methods, since the pressure loss is set in anticipation of the worst case, there will be a waste of filling time and a preset temperature of the precooler. That is, if the pressure loss is estimated to be greater than the actual loss, the filling speed will be unnecessarily reduced, and it is likely to take a longer time to fill up the hydrogen tank. In addition, the map constructed with anticipation of pressure loss in the worst case is equivalent to an anticipation of a condition where the temperature rise of the gas due to the pressure loss is expected to be the most significant, that is, an additional temperature margin will be set, which means that there is room for increasing the set temperature of the precooler.

Additionally, in the existing gas filling methods, when the hydrogen station fills the fuel cell vehicle with the hydrogen gas required for the fuel cell to generate electricity, various worst cases in the market are taken into consideration. For example, when the piping temperature is relatively low, the gas filling system of the hydrogen station may further provide a map of faster filling speed to the consumer for selection, such as using a cold dispenser for filling gas.

Since various worst scenarios are likely to exist at the same time, the reserved margins (such as setting additional temperature margins) are normally greater than actual value. Being forced to fill slowly or pre-cooling the hydrogen gas too much may all result in waste in power consumption. By utilizing appropriate techniques, unnecessary margins may be reduced and filling speed may be increased without compromising safety, or the margin of relaxing set temperature of precooler may be increased.

Moreover, in the related art (Non-Patent Document 2: SAE J2601-2020, Fueling Protocols for Light Duty Gaseous Hydrogen Surface Vehicles), when the cold dispenser is used to fill the gas, the control of the cold dispenser cannot be practically applied to the gas filling system because the cold dispenser does not show the accurate temperature detection position.

SUMMARY

In view of the aspects set forth above, the purpose of the present disclosure is to provide a gas filling method, which may fill gas under optimized filling conditions so as to reduce the waste of filling time and power consumption of the precooler.

[1] In order to achieve the above purpose, the present disclosure provides a gas filling method in which a gas filling system is used to fill a tank with gas from a supply source, and the gas filling system includes: a supply source in which compressed gas is stored; a piping, connecting the supply source to the tank mounted on a movable body, and the piping is provided with a control valve, a pressure sensor, a gas temperature sensor and a flow rate sensor; and a control device, operating the control valve in a specific filling condition, and controlling the flow rate of the gas flowing through the piping. The gas filling method includes the following steps: an effective heat mass calculation step, which uses the heat capacity of the piping and the detection value of the gas temperature sensor to calculate the value of the effective heat mass related to the temporary pressure loss caused by the piping before gas-filling is started; a pressure loss parameter calculation step, which uses the detection value of the pressure sensor when the flow rate of the gas in the piping changes to calculate the value of the pressure loss parameter related to the pressure loss caused by the piping after the gas-filling is started; and a filling condition changing step, which changes the filling condition into a condition that is defined based on the value of the pressure loss parameter and gas-filling is continued.

[2] Further, in the present disclosure, the control device operates the control valve under a filling condition defined by a filling control map selected from a plurality of predetermined filling control maps, and, under the filling condition changing step, the filling control map selected by the control device is replaced with a map among the plurality of filling control maps defined based on the value of the pressure loss parameter.

[3] Furthermore, in the present disclosure, in the pressure loss parameter calculation step, the value of the pressure loss parameter is calculated based on the following equation (1-1), and in the following equation (1-1), "$k_0$" is the pressure loss parameter, "$dP_{loss}$" is the pressure difference in the piping before and after the reduction in the flow rate of the gas, "$\rho$" is the density of the gas in the piping, and "dm" is the mass flow of gas in the piping,

[Equation (1-1)]

$$k_0 = \frac{dP_{loss} \cdot \rho}{dm^2}. \quad (1\text{-}1)$$

[4] Moreover, in the present disclosure, the control device operates the control valve under a filling condition defined by a filling control map selected from a plurality of predetermined filling control maps, and, under the filling condition changing step, the filling control map selected by the control device is replaced with a map among the plurality of filling control maps defined based on the value of the heat mass related to the temporary pressure loss caused by the piping.

[5] Additionally, in the present disclosure, in the effective heat mass calculation step, the value of the effective heat mass is calculated based on the following equation (1-2). In the following equation (1-2), "$T_{tube}$" is the temperature detected by the gas temperature sensor, "$T_{amb}$" is the atmospheric temperature, "$T_{HE}$" is the heat exchanger temperature, "$m_i$" is the mass of the piping, "$Cp_i$" is the specific heat capacity of the piping, and "$m_i \times Cp_i$" is the heat capacity of the piping, and "$k_0$" is the pressure loss parameter,

[Equation (1-2)]

$$\text{Heat mass}_{Real\ time} = \left(\frac{T_{tube} - T_{HE}}{T_{amb} - T_{HE}}\right) \times \sum (m_i \times Cp_i) + f(k_0). \quad (1\text{-}2)$$

[6] Furthermore, in the present disclosure, in the effective heat mass calculation step, the value of the effective heat mass is calculated based on the following equation (1-3). In the following equation (1-3), "$T_{tube}$" is the temperature detected by the gas temperature sensor, "$T_{amb}$" is the atmospheric temperature, "$T_{HE}$" is the heat exchanger temperature, "$m_i$" is the mass of the piping, "$Cp_i$" is the specific heat capacity of the piping, "$m_i \times Cp_i$" is the heat capacity of the piping,

[Equation (1-3)]

$$\text{Heat mass}_{Real\ time} = \left(\frac{T_{tube} - T_{HE}}{T_{amb} - T_{HE}}\right) \times \sum (m_i \times Cp_i). \quad (1\text{-}3)$$

[7] Moreover, in the present disclosure, in the pressure loss parameter calculation step, the value of the pressure loss parameter is calculated by using the detection value of the pressure sensor when the flow rate of the gas in the piping decreases from a flow rate greater than 0 to 0 or close to 0.

Based on the above, in the gas filling method of the present disclosure, among the plurality of filling control maps that can be selected at the time of gas filling, in addition to the map defined based on the value of the pressure loss parameter, the map that is defined based on the value of heat mass of the piping is also added for selection. Since the value of the heat mass of the piping is taken into consideration, the margin for the set temperature of the precooler may be relaxed, so that the power consumption of the precooler may be decreased. In addition, by increasing the margin of relaxing the set temperature of the precooler, the service life of parts such as piping and piping seals may be prolonged, and the equipment cost may be reduced by lowering the specifications of the piping and the precooler.

In order to make the above-mentioned features and advantages of the present disclosure more comprehensible, the following embodiments are given and described in detail with the accompanying drawings as follows.

DESCRIPTION OF THE EMBODIMENTS

Hereinafter, an embodiment of the present disclosure will be described with reference to the accompanying drawings.

Figure 1:
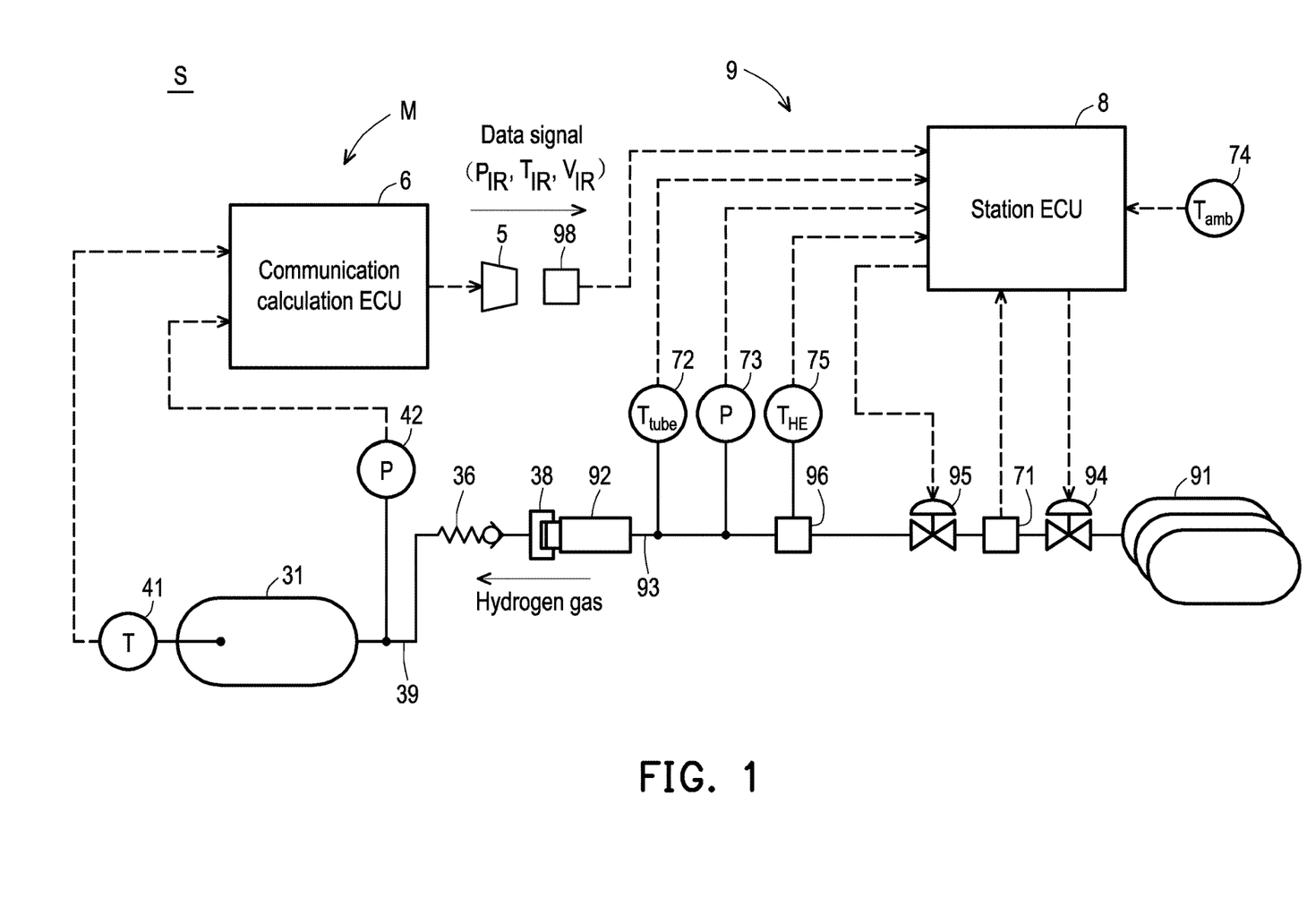
FIG. 1 is a diagram showing the structure of a hydrogen filling system which adopts a hydrogen filling method according to an embodiment of the present disclosure.

FIG. 1 is a diagram showing the structure of a hydrogen filling system S which adopts a hydrogen filling method according to an embodiment of the present disclosure. The hydrogen filling system S is composed of a combination of a hydrogen station 9 having a supply source of compressed hydrogen, and a fuel cell vehicle M (hereinafter, simply referred to as "vehicle M") having a hydrogen tank for accommodating the hydrogen supplied by the hydrogen station 9. The hydrogen filling method of the present embodiment is a method of filling the tank of the vehicle M with hydrogen from the hydrogen station 9, and is realized by the hydrogen filling system S. Hereinafter, the structure of one side of the vehicle M will be described first, and the structure of one side of the hydrogen station 9 will be described afterwards.

The vehicle M is a fuel cell vehicle including: a tank in which hydrogen gas is stored; and a fuel cell system (not shown) for generating electricity by using the hydrogen gas and air stored in the tank as fuel gas; and the vehicle M is driven by the electric power generated by the fuel cell system to drive the motor. Hereinafter, the vehicle M is exemplified as a fuel cell vehicle, but the present disclosure is not limited thereto. The present disclosure only needs to be a movable body provided with a tank for storing hydrogen gas, and may be applied freely.

The vehicle M includes a hydrogen tank 31 that stores hydrogen gas supplied from the hydrogen station 9; a vehicle piping 39 that extends from the hydrogen tank 31, and a fuel cell system (not shown) that uses the hydrogen gas stored in the hydrogen tank 31 to generate electricity, and use the generated electric power for driving; an infrared communication device 5, which transmits data signals related to the hydrogen tank 31 to the hydrogen station 9; and a communication calculation ECU 6 that generates a data signal transmitted from the infrared communication device 5. In the following, to exemplify the vehicle M, a vehicle including the infrared communication device 5 and the communication calculation ECU 6 will be described, but the present disclosure is not limited thereto. The present disclosure may also be applied to a vehicle M that does not include the infrared communication device 5 and the communication calculation ECU 6.

The vehicle piping 39 includes an insertion hole 38 into which a filling nozzle 92 of the hydrogen station 9 to be described later is fitted; and a check valve 36 provided in the vehicle piping 39 and near the insertion hole 38 for preventing hydrogen gas from flowing back toward the insertion hole 38 from one side of the hydrogen tank 31.

The communication calculation ECU 6 is connected to an in-tank temperature sensor 41 and an in-tank pressure sensor 42 as means for acquiring information related to the hydrogen tank 31. The in-tank temperature sensor 41 detects the temperature of the hydrogen gas in the hydrogen tank 31 and transmits a signal corresponding to the detected value to the communication calculation ECU 6. The in-tank pressure sensor 42 detects the pressure in the hydrogen tank 31 and transmits a signal corresponding to the detected value to the communication calculation ECU 6.

The communication calculation ECU 6 is a microcomputer, and is composed of an interface for performing A/D conversion on the detection signals of the sensors 41 and 42 described above, a CPU for executing a signal generating process described later, a drive circuit that drives the infrared communication device 5 in a mode determined by the above-described process, a storage device that stores various data, and the like.

The storage device of the communication calculation ECU 6 records a program for executing a data signal generating process described later, and inherent information including the volume value of the hydrogen tank 31 mounted when the vehicle M is manufactured. In addition to the volume value of the hydrogen tank, this inherent information further includes information about the hydrogen tank 31 that can be specified at the time of manufacture, for example, the capacity and the material of the hydrogen tank derived from the volume value using a known conversion rule.

The CPU of the communication calculation ECU 6 starts a signal generating process, that is, generates a signal to be transmitted to the hydrogen station 9 by the communication device 5, when, for example, the fuel lid protecting the insertion hole 38 is opened. Then, the CPU of the communication calculation ECU 6 ends the signal generating process when, for example, the nozzle is detached from the insertion hole 38 to achieve the state where the hydrogen gas cannot be filled.

In the signal generating process, the temperature transmission value $T_{IR}$ corresponding to the current value of the temperature in the hydrogen tank, the pressure transmission value $P_{IR}$ corresponding to the current value of the pressure in the hydrogen tank, and the volume transmission value $V_{IR}$ corresponding to the current value of the volume of the hydrogen tank are acquired in each specific cycle, and data signals corresponding to these values ($T_{IR}$, $P_{IR}$, $V_{IR}$) are generated. The temperature transmission value $T_{IR}$ uses the detection value of the in-tank temperature sensor 41 at this time. The pressure transmission value $P_{IR}$ uses the detection value of the in-tank pressure sensor 42 at this time. Moreover, the volume transmission value $V_{IR}$ uses the value recorded in the above-mentioned storage device.

The drive circuit of the communication calculation ECU 6 drives the infrared communication device 5 (makes it blink) based on the data signal and the interrupt signal generated by the signal generating process described above. Thereby, a data signal including state information related to the state in the hydrogen tank (that is, the temperature transmission value $T_{IR}$, the pressure transmission value $P_{IR}$, etc.) and the inherent information (that is, the volume transmission value $V_{IR}$, etc.) is transmitted to the hydrogen station 9.

The hydrogen station 9 includes: an accumulator 91 that stores hydrogen gas to be supplied to the vehicle M at high pressure; a station piping 93 that reaches a filling nozzle 92 from which the hydrogen gas is discharged from the accumulator 91; a shut-off valve 94 and a flow control valve 95, which are provided on the station piping 93; and, a station ECU 8, which controls these valves 94 and 95.

The station ECU 8 is an electronic computer that operates the shut-off valve 94 and the flow control valve 95 under specific filling conditions after the filling nozzle 92 is connected to the insertion hole 38 provided on the vehicle M, thereby controlling the flow rate of hydrogen gas flowing through the station piping 93, and filling the high-pressure hydrogen gas stored in the accumulator 91 to the hydrogen tank 31 of the vehicle M.

In the hydrogen filling system S, when the filling nozzle 92 is connected to the insertion hole 38, a single piping is formed by the station piping 93, which is a component constituting the hydrogen station 9, and the vehicle piping 39, which is a component constituting the vehicle M. In this manner, the hydrogen tank 31 mounted on the vehicle M and the accumulator 91 are connected through the piping.

A precooler (i.e., a heat exchanger) 96 for cooling the hydrogen gas is provided between the flow control valve 95 and the filling nozzle 92 in the station piping 93. That is, the precooler 96 facilitates heat exchange between the refrigerant and the hydrogen gas flowing through the station piping 93, and the hydrogen gas depressurized through the flow control valve 95 is cooled to a predetermined cooling temperature (for example, about −40° C.) by the precooler 96. With such precooler 96, the hydrogen gas may be cooled at a position where the hydrogen gas is just about to be filled into the hydrogen tank 31. In this way, the temperature rise of the hydrogen gas in the hydrogen tank 31 may be suppressed, and even rapid filling may be achieved.

Various sensors 71, 72, 73, 74, and 75 are connected to the station ECU 8 so as to detect the state of the hydrogen gas at the position where the hydrogen gas is just about to be filled into the hydrogen tank 31.

The flow rate sensor 71 is arranged between the shut-off valve 94 and the flow control valve 95 in the station piping 93, and transmits a signal corresponding to the mass per unit time of the hydrogen gas flowing through the station piping 93, that is, the mass flow rate, to the station ECU8.

The station temperature sensor 72 is arranged at the downstream side of the precooler 96 in the station piping 93, and transmits a signal corresponding to the temperature (which may be regarded as the piping temperature $T_{tube}$ or the station temperature $T_{ST}$) of the hydrogen gas in the station piping 93 to the station ECU8.

The station pressure sensor 73 is provided on the downstream side of the precooler 96 in the station piping 93, and transmits a signal corresponding to the pressure of the hydrogen gas in the station piping 93 to the station ECU 8.

The atmospheric temperature sensor 74 detects the temperature of the atmospheric air, and transmits a signal corresponding to the detected value to the station ECU 8. In addition, the atmospheric temperature detected by the atmospheric temperature sensor 74 may sometimes be regarded as the temperature of the hydrogen gas in the fuel tank of the vehicle M at the start of filling.

The heat exchanger temperature sensor 75 is arranged on the downstream side of the precooler 96 in the station piping, detects the temperature of the precooler 96, and transmits a signal corresponding to the detection value $T_{HE}$ to the station ECU 8. In addition, the temperature of the precooler 96 detected by the heat exchanger temperature sensor 75 is used as a parameter for calculating the effective heat mass of the piping 93.

An infrared communication device 98 for communicating with the vehicle M is provided on the filling nozzle 92. The filling nozzle 92 is connected to the insertion hole 38 so that the infrared communication device 98 is opposed to the infrared communication device 5 provided on the vehicle M, and data signals may be transmitted and received between these communication devices 98 and 5 through infrared rays.

Figure 2:
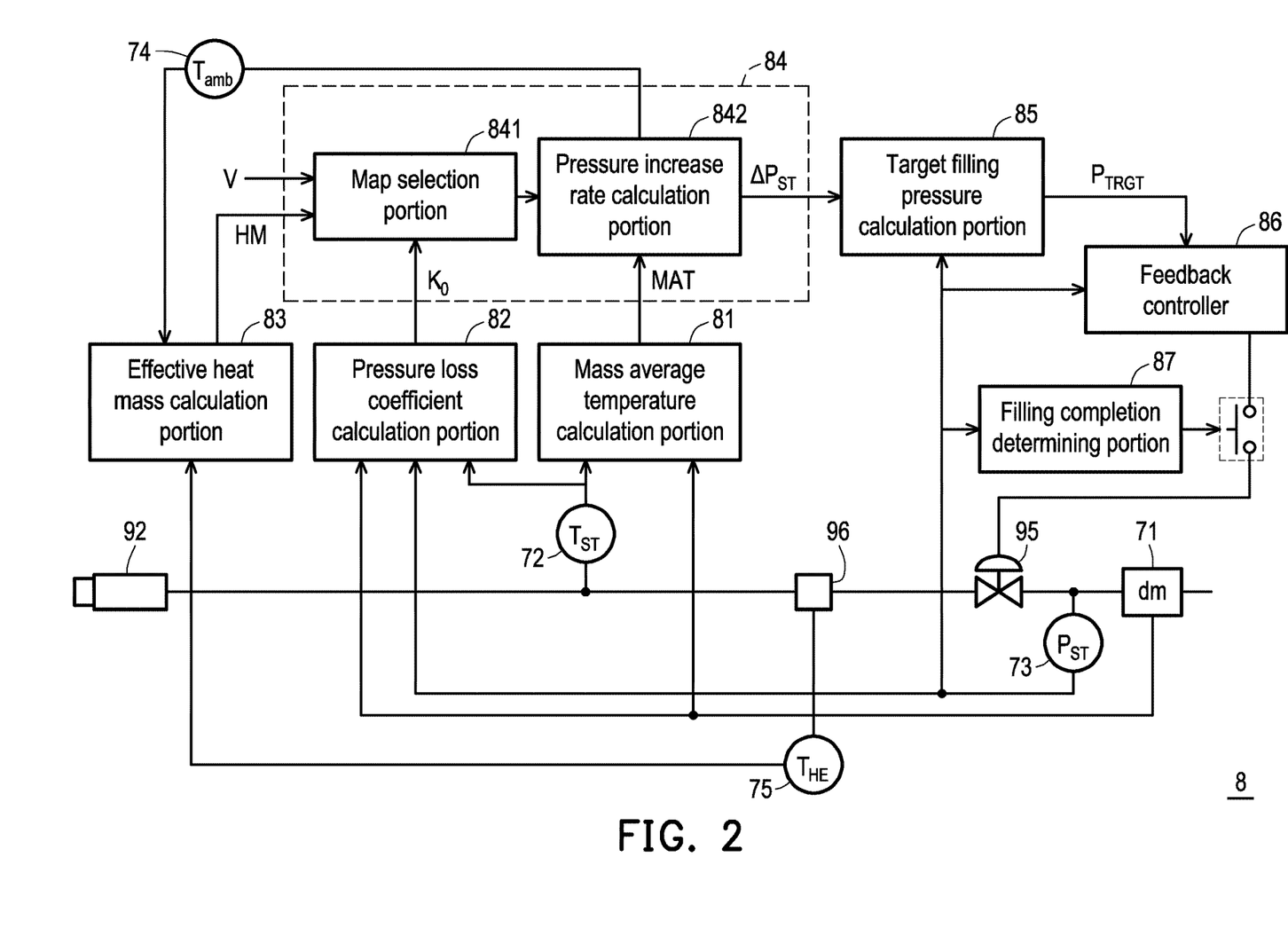
FIG. 2 is a functional block diagram showing the configuration of a control circuit for fill flow control implemented by a station ECU.

FIG. 2 is a functional block diagram showing the configuration of a control circuit for fill flow control implemented by a station ECU 8. The station ECU 8 performs fill flow control, that is, specifying a target pressure increase rate according to the state of the hydrogen tank of the vehicle, and operates the flow control valve 95 to achieve this target pressure increase rate. In FIG. 2, only the modules 81 to 87 in the station ECU 8 that are relevant to the implementation of the fill flow control are shown.

The mass average temperature calculation portion 81 calculates the mass average temperature MAT of the hydrogen gas after being processed by the precooler 96 based on the detection values of the station temperature sensor 72 and the flow rate sensor 71. This mass average temperature MAT is used to set the target pressure increase rate in the target pressure increase rate setting portion 84. However, it takes about a few tens of seconds for the detection value of the station temperature sensor 72 to actually reach the temperature of the gas flowing out of the precooler 96 just after the hydrogen filling is started. Therefore, the mass average temperature calculation portion 81 does not use the detection value of the station temperature sensor 72 during the period of a few tens of seconds or so (more specifically, e.g., 30 seconds) elapses after beginning of filling, but outputs the preset value as a mass average temperature MAT.

The pressure loss coefficient calculation portion 82 calculates the pressure loss coefficient $k_0$, that is, parameters related to the pressure loss generated in the station piping 93 and the vehicle piping 39 (hereinafter, they are also collectively referred to as "connecting piping") when the hydrogen gas flows through the station piping 93 and the vehicle piping 39. Here, the pressure loss refers to a pressure difference between a specific position on the upstream side (for example, the detection position of the station pressure sensor 73) and a specific position on the downstream side (for example, inside the hydrogen tank 31) of the connecting piping when the hydrogen gas flows through the connecting piping.

Next, the definition of the effective heat mass value Heat mass (for example, the value of the heat mass of the piping system of the gas filling system) and the calculation method thereof will be described. In the piping system of a general hydrogen station, efforts are made to minimize the heat mass of the piping at the time of design, and the value of the heat mass of the designed piping is taken as a fixed value of the heat mass of the piping. However, the continuous process of filling the gas reduces the temperature of the piping (as in the case of a cold dispenser, for example), the heat supplied to the hydrogen gas by the piping system is reduced, and as such, the situation changes from one moment to another.

In the present embodiment, during the gas filling process, the temperature of the piping, that is, the temperature of the flowing gas during filling, is detected by the piping temperature sensor 72 (i.e., the station temperature sensor 72). The piping temperature sensor 72 for acquiring the temperature of the piping may be a sensor that can also be used as a gas temperature sensor in general, so the piping temperature sensor 72 is also called a gas temperature sensor 72. When a common gas temperature sensor is not adopted, different sensors (gas temperature sensor and piping temperature sensor) may be arranged at the most appropriate positions. After the filling is completed, the temperature of the gas in the piping is detected. However, since the thermal conductivity of hydrogen gas is high, the temperature of the hydrogen gas may be regarded as almost equal to the temperature of the piping. Therefore, the temperature $T_{tube}$ of the piping detected by the gas temperature sensor 72 may be used as the temperature of the hydrogen gas, and the temperature $T_{tube}$ may be directly applied to the value for calculating the heat mass of the piping. In this way, the value of the current substantial heat mass is calculated based on the temperature of the piping at the beginning of the gas filling.

In addition, the temperature $T_{HE}$ of the precooler 96 is also detected by the heat exchanger temperature sensor 75 as an expected value of the temperature of the gas flowing in the future. In this way, the value of the effective heat mass of the piping system is calculated using the piping temperature $T_{tube}$ detected by the gas temperature sensor 72, the heat exchanger temperature $T_{HE}$ detected by the heat exchanger temperature sensor 75, and the atmospheric temperature $T_{amb}$ as parameters.

In other words, before the gas filling is started, by using the heat capacity of the piping, the detection value of the piping temperature sensor, the atmospheric temperature detection value, and the detection value of the heat exchange temperature sensor, the value of the effective heat mass related to the temporary pressure loss caused by the piping may be calculated.

In this way, when gas filling is performed, in the filling condition changing step, the filling control map selected by the control device may be replaced with a map among the plurality of filling control maps defined by a value related to temporary pressure loss caused by piping (that is, the value of the effective heat mass of the piping).

Moreover, the piping system is manufactured in different sizes, shapes and specifications. The temperature of these piping in the piping system changes all the time after the gas filling is completed. The actual temperature detection is not easy for many types of piping temperature detection. Accordingly, in order to use the piping temperature $T_{tube}$ detected by the gas temperature sensor 72 as the temperature of the representative piping system, the structure and the like of the heat insulating material arranged in other piping in the piping system may be adjusted in advance so that the temperatures of the other components are less than the piping temperature $T_{tube}$.

It may be that the temperature sensor may not directly detect the temperature of the gas, but may detect the temperature of the part related to the temperature of the gas (for example, the temperature of the piping through which the gas flows, and/or the temperature of refrigerant for cooling the gas in the precooler 96).

In the following equation (1), "$T_{tube}$" is the temperature detected by the piping temperature sensor, which may be measured by the gas temperature sensor 72, "$T_{amb}$" is the atmospheric temperature, which may be measured by the atmospheric temperature sensor 74, "$T_{HE}$" is the heat exchanger temperature, which may be measured by the heat exchanger temperature sensor 75, "$T_{amb}$" is the atmospheric temperature, "$m_i$" is the mass of the piping, which may be determined by the specification of the piping, "$Cp_i$" is the specific heat capacity of the piping, which may be obtained from the specification of the piping (such as the material used to make the piping), and "$m_i \times Cp_i$" is the heat capacity of the piping, as shown in the following equation (1). When the temperatures of the components are not consistent, this method may not be used, for example, the value of the actually measured heat capacity may be adopted. Accordingly, after the hydrogen filling is started, the effective heat mass calculation portion 83 uses the detection values of hydrogen detected by the gas temperature sensor 72, the atmospheric temperature sensor 74 and the heat exchanger temperature sensor 75, etc. connected to the piping to perform the calculation shown in the following equation (1), thereby calculating the effective heat mass value Heat mass.

[Equation 1]

$$\text{Heat mass}_{Real\ time} = \left(\frac{T_{tube} - T_{HE}}{T_{amb} - T_{HE}}\right) \times \sum (m_i \times Cp_i). \quad (1)$$

Next, the definition of the pressure loss coefficient k0 and the calculation method thereof will be described. The following are examples only, and other suitable calculation methods may also be adopted. The pressure loss dPloss generated in the flow channel of a general gas is represented by dimensionless loss coefficient $\zeta$, gas density $\rho$, and flow velocity v as shown in the following equation (2).

[Equation 2]

$$dP_{loss} = \frac{\zeta \cdot \rho \cdot v^2}{2} \quad (2)$$

In the above equation (2), the flow velocity v is not measured in the general hydrogen station 9. Therefore, the flow velocity v is rewritten as the mass flow dm that may be measured by the flow rate sensor 71 as expressed by the following equation (3). In the following equation (3), "A" is a cross-sectional area of the flow channel.

[Equation 3]

$$v = \frac{dm}{A \cdot \rho} \quad (3)$$

Here, the pressure loss coefficient k0 in the present embodiment is defined by the following equation (4) using the loss coefficient $\zeta$ and the cross-sectional area A of flow channel in the above-mentioned equations (2) and (3). As shown in the following equation (4), the value of the pressure loss coefficient k0 is determined by the shape of the hydrogen gas flow channel formed in the connecting piping. The following equation (4) is only an example of calculating the value of the pressure loss coefficient k0, and the present disclosure is not limited to the calculation method.

[Equation 4]

$$k_0 = \frac{\zeta}{2A^2} \quad (4)$$

Moreover, according to the above equations (2) to (4), the pressure loss coefficient k0 is represented by the following equation (5) based on the pressure loss dPloss, the gas density $\rho$, and the mass flow rate dm. As shown in the following equation (5), the greater the pressure loss coefficient k0, the greater the pressure loss dPloss. Moreover, in the following equation (5), the pressure loss dPloss may be calculated using the detection value of the station pressure sensor 73 when the flow rate of hydrogen gas in the connecting piping decreases. Furthermore, the mass flow dm may be measured by the flow rate sensor 71. Moreover, since the gas density ρ may be expressed as a function of the pressure and temperature of hydrogen gas, the gas density ρ may be calculated based on the detection values of the station temperature sensor 72 and the station pressure sensor 73. Therefore, after the hydrogen filling is started, the pressure loss coefficient calculation portion 82 uses the detection value of the station pressure sensor 73 and the detection value of the flow rate sensor 71 when the hydrogen flow rate in the connecting piping decreases to perform the calculation in the following equation (5), thereby calculating the value of the pressure loss coefficient $k_0$.

[Equation 5]

$$k_0 = \frac{dP_{loss} \cdot \rho}{dm^2}. \qquad (5)$$

The target pressure increase rate setting portion 84 sets a target pressure increase rate ΔPST based on the mass average temperature MAT calculated by the mass average temperature calculation portion 81, the pressure loss coefficient k0 calculated by the pressure loss coefficient calculation portion 82, the atmospheric temperature Tamb detected by the atmospheric temperature sensor 74, and the tank volume V of the hydrogen tank 31, etc. The target pressure increase rate ΔPST corresponds to the target pressure increase rate of the hydrogen gas in the connecting piping during the filling period. More specifically, the target pressure increase rate setting portion 84 uses the map selection portion 841 and the pressure increase rate calculation portion 842 to set the target pressure increase rate $\Delta P_{ST}$.

A plurality of filling control maps are stored in the storage medium of the map selection portion 841. The filling control maps associates the atmospheric temperature Tamb with the values of a plurality of coefficients (a, b, c, d) representing a model equation (refer to the following equation (6)) used for setting the target pressure increase rate ΔPST. That is, the filling control map is a map that defines filling conditions in filling flow control.

Figure 3A:
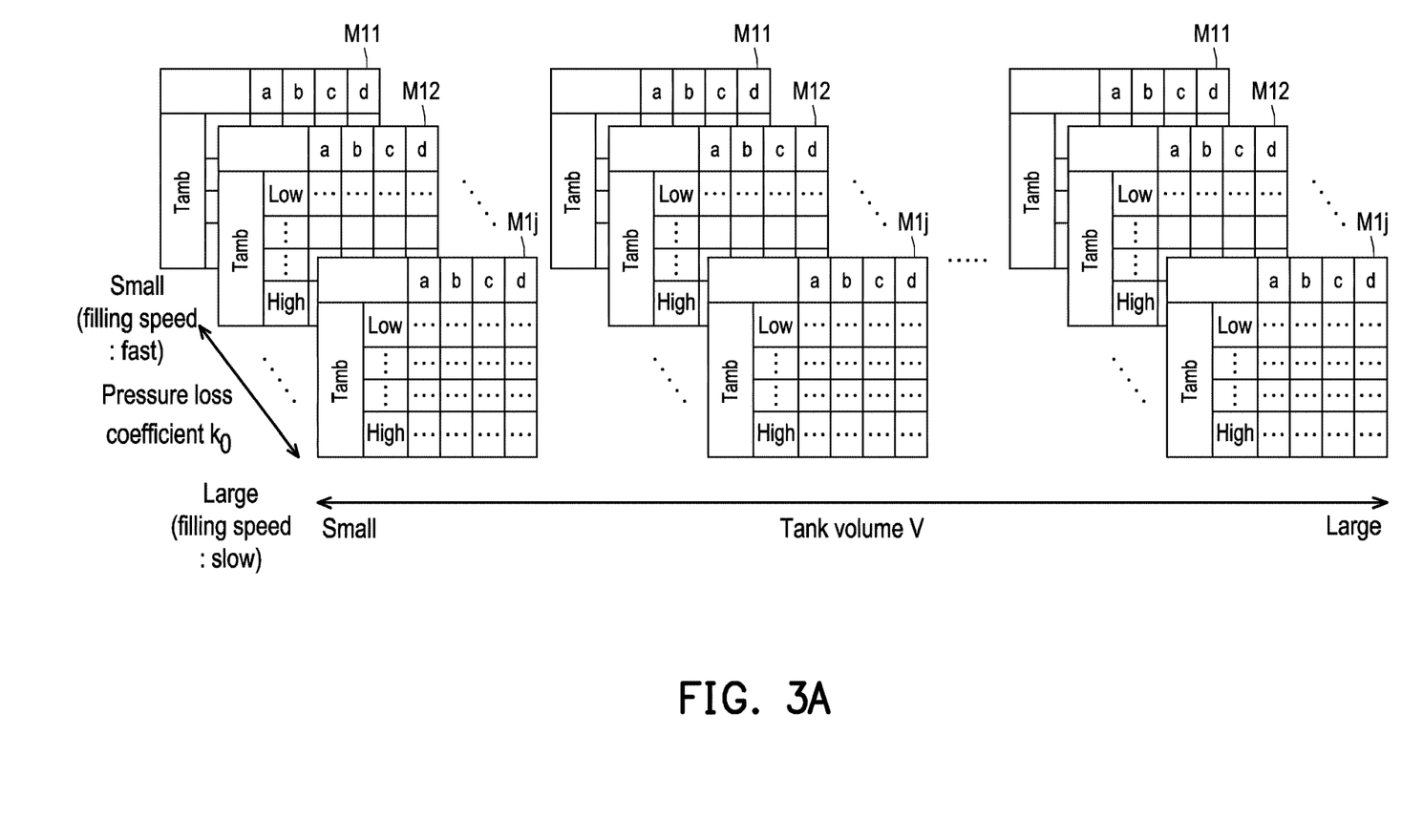
FIG. 3A is a diagram for explaining the procedure of selecting a filling control map in a map selection portion.

FIG. 3A is a diagram for explaining the procedure of selecting a filling control map in a map selection portion 841. The filling conditions for filling the hydrogen tank as quickly as possible vary depending on the tank volume of the connected hydrogen tank and the pressure loss coefficient of the connecting piping. Therefore, in the present embodiment, the tank volume is divided into i stages (i is an integer of 2 or more), and the pressure loss coefficient is further divided into j stages (j is an integer of 2 or more). A combination of i×j sheets of filling control maps M11, M12, . . . , M1j, M21, M22, . . . , M2j, . . . , Mi1, Mi2, . . . , Mij adaptable for these volumes and pressure loss coefficients are constructed in advance, and the i×j sheets of filling control maps are stored in the storage medium of the map selection portion 841.

Figure 3B:
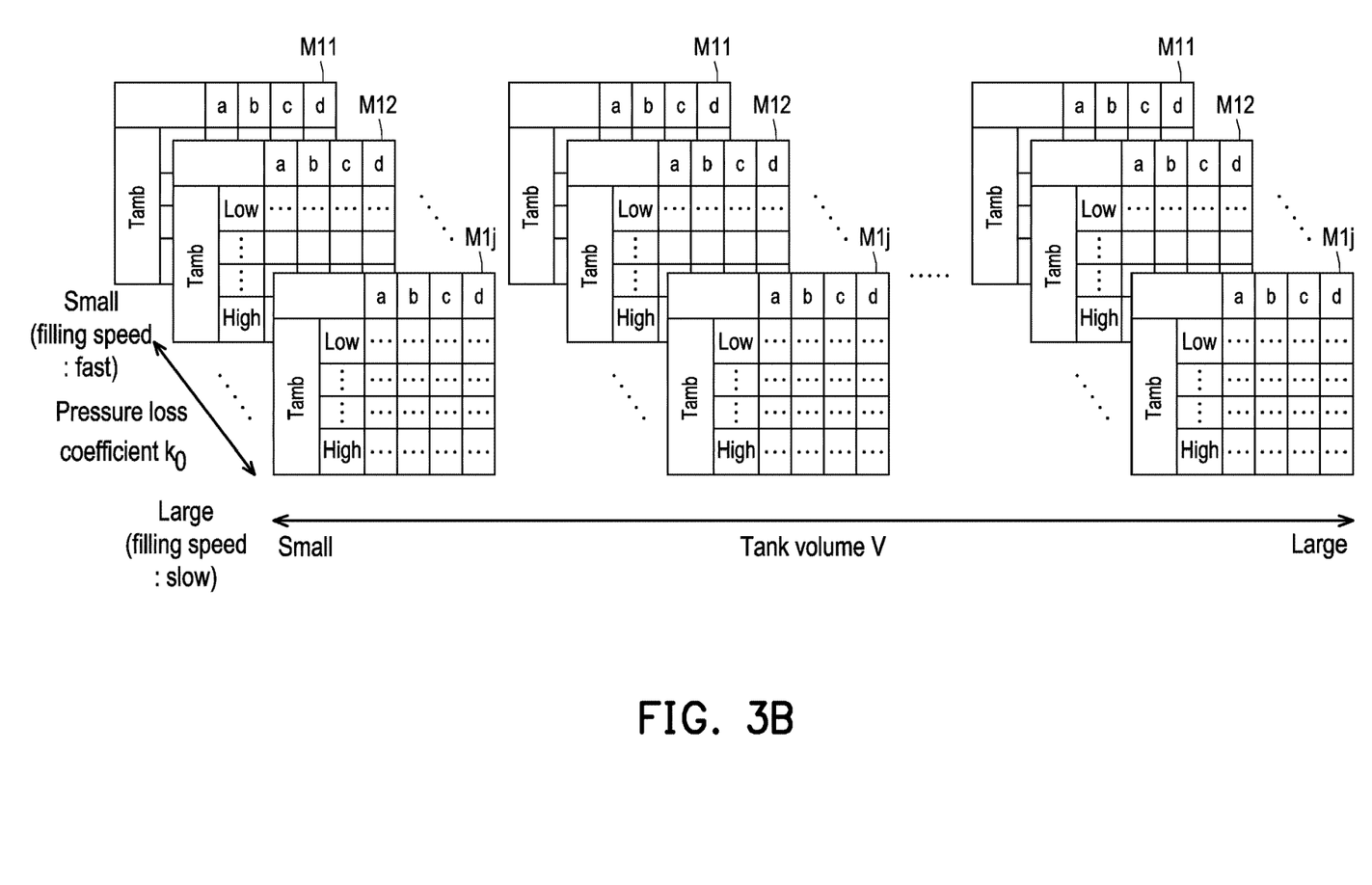
FIG. 3B is a diagram for explaining another procedure of selecting a filling control map in the map selection portion.

FIG. 3B is a diagram for explaining another procedure of selecting a filling control map in the map selection portion 841. The filling conditions for filling the hydrogen tank as quickly as possible vary depending on the tank volume of the connected hydrogen tank, the pressure loss coefficient of the connecting piping, and the heat capacity of the connecting piping. Therefore, in the present embodiment, the tank volume is divided into i stages (i is an integer of 2 or more), and the pressure loss coefficient and heat capacity are further divided into j stages (j is an integer of 2 or more). A combination of i×j sheets of filling control maps M11, M12, . . . , M1j, M21, M22, . . . , M2j, . . . , Mi1, Mi2, . . . , Mij adaptable for these volumes, pressure loss, and heat capacity are constructed in advance, and the i×j sheets of filling control maps are stored in the storage medium of the map selection portion 841.

FIG. 3A is different from FIG. 3B in that FIG. 3A is based on the pressure loss coefficient of the connecting piping, while FIG. 3B takes into consideration of the heat capacity of the connecting piping in addition to the pressure loss coefficient based on the connecting piping. For large vehicles, the pressure loss of the connecting piping has a great influence on the filling conditions for filling the hydrogen tank, but the influence of the heat capacity of the connecting piping also exists and should not be ignored.

Therefore, another embodiment is provided for large vehicles. The value of the pressure loss coefficient k0 is also taken into consideration in equation 1 for calculating the effective heat mass value Heat mass described in the above equation (1). When both the pressure loss and the heat capacity are taken into consideration, they are expressed as shown in the following equation (1A). For example, after the hydrogen filling is started, the effective thermal mass calculation portion 83 uses the detection values of hydrogen obtained from the gas temperature sensor 72, the atmospheric temperature sensor 74, and the heat exchanger temperature sensor 75 of the connecting piping and the value of the pressure loss coefficient to perform the calculation shown in equation (1A). In this manner, the effective heat mass value Heat mass may be calculated.

[Equation 1A]

$$\text{Heat mass}_{Real\ time} = \left(\frac{T_{tube} - T_{HE}}{T_{amb} - T_{HE}}\right) \times \sum (m_i \times Cp_i) + f(k_0). \qquad (1A)$$

The map selection portion 841 acquires the values of the volume V of the hydrogen tank 31 and the pressure loss coefficient k0, selects the filling control map corresponding to the values of the volume V and the pressure loss coefficient $k_0$ from the above-mentioned i×j sheets of filling control maps, and transmits the selected filling control map to the pressure increase rate calculation portion 842. However, when the pressure loss coefficient increases, the pressure loss generated in the connecting piping also increases, and the temperature rise of the hydrogen gas in the piping also increases. Therefore, as the value of the pressure loss coefficient $k_0$ calculated by the pressure loss coefficient calculation portion 82 is greater, the map selection portion 841 selects a map with a slower filling speed in order to suppress the temperature increase results from the pressure loss.

As described above, in the map selection portion 841, in order to select an appropriate filling control map, the value of the volume V of the hydrogen tank 31 and the value of the pressure loss coefficient k0 are required. The value of the volume V of the hydrogen tank 31 may be acquired by the map selection portion 841 immediately after the filling is started by using the volume transmission value $V_{IR}$ transmitted from the infrared communication device 5 of the vehicle M, for example. On the other hand, the value of the pressure loss coefficient k0 is calculated using the period during which the flow rate of the hydrogen gas flowing through the connecting piping is temporarily reduced after the hydrogen filling is started as described above. Therefore, the map selection portion 841 may acquire the value of the pressure loss coefficient k0 only after a period of time has elapsed since filling was started.

Therefore, when the value of the pressure loss coefficient k0 cannot be obtained immediately after the start of filling, the map selection portion 841 uses the value of the volume V of the hydrogen tank 31 obtained by the infrared communication as described above and the value of predetermined pressure loss coefficient k0 to select the filling control map. In addition, under the circumstances, the map selection portion 841 assumes that the value of the pressure loss coefficient k0 is an estimated value greater than the actual value, more specifically, for example, the maximum value in the range expected in the station in use, and selects a filling control map corresponding to the value of the volume V of the hydrogen tank 31 as a temporary map, and filling is performed under this temporary map.

Thereafter, when the value of the pressure loss coefficient k0 has already been acquired, the map selection portion 841 selects a filling control map corresponding to the value of the pressure loss coefficient k0 as the real map, and filling is continued under this real map. In this manner, an appropriate filling control map corresponding to the actual pressure loss may be selected so that the hydrogen tank 31 may be filled as quickly as possible.

The pressure increase rate calculation portion 842 uses the mass average temperature MAT, the atmospheric temperature $T_{amb}$, and the filling control map selected by the map selection portion 841 to perform the calculation shown in the following equation (6), thereby calculating the filling time $t_{final}$ corresponding to the time from the specific filling start time $t_{ini}$ to the specific filling end predetermined time.

[Equation 6]

$$t_{final}=a(T_{amb})MAT^3+b(T_{amb})MAT^2+c(T_{amb})MAT+d(T_{amb}) \quad (6).$$

In the above equation (6), the values of the four coefficients (a, b, c, d) are respectively calculated based on the atmospheric temperature Tamb detected by the atmospheric temperature sensor 74 to search for the filling control map selected by the map selection portion 841. Furthermore, the pressure increase rate calculation portion 842 sets the target pressure increase rate ΔPST so that the hydrogen tank 31 is filled from the filling start time tini to the above-mentioned filling time tfinal.

The target filling pressure calculation portion 85 uses the target pressure increase rate ΔPST set by the target pressure increase rate setting portion 84 and the detection value PST (hereinafter, also referred to as "filling pressure") of the station pressure sensor 73 to calculate the target filling pressure PTRGT corresponding to the target value of the filling pressure after a predetermined time.

The feedback controller 86 determines the command opening of the flow control valve so that the filling pressure $P_{ST}$ becomes the target filling pressure $P_{TRGT}$ based on a known feedback control law, and inputs the command opening to a drive device (not shown) of the flow control valve 95. The drive device adjusts the opening of the flow control valve 95 to achieve this command opening. In this manner, the hydrogen tank 31 is filled with hydrogen gas so that the target pressure increase rate $\Delta P_{ST}$ set by the target pressure increase rate setting portion 84 is realized.

The filling completion determining portion 87 determines whether the filling of the hydrogen gas has been completed, and when it is determined that the filling is complete, the command opening is set to 0 to complete the filling of the hydrogen gas. More specifically, when the filling pressure $P_{ST}$ detected by the station pressure sensor 73 exceeds a specific threshold value, the filling completion determining portion 87 determines that the hydrogen tank 31 has been filled, and sets the command opening to 0 to complete the filling of hydrogen gas.

Next, a specific procedure for filling the hydrogen tank 31 with hydrogen gas in the above-described hydrogen filling system S will be described.

Figure 4:
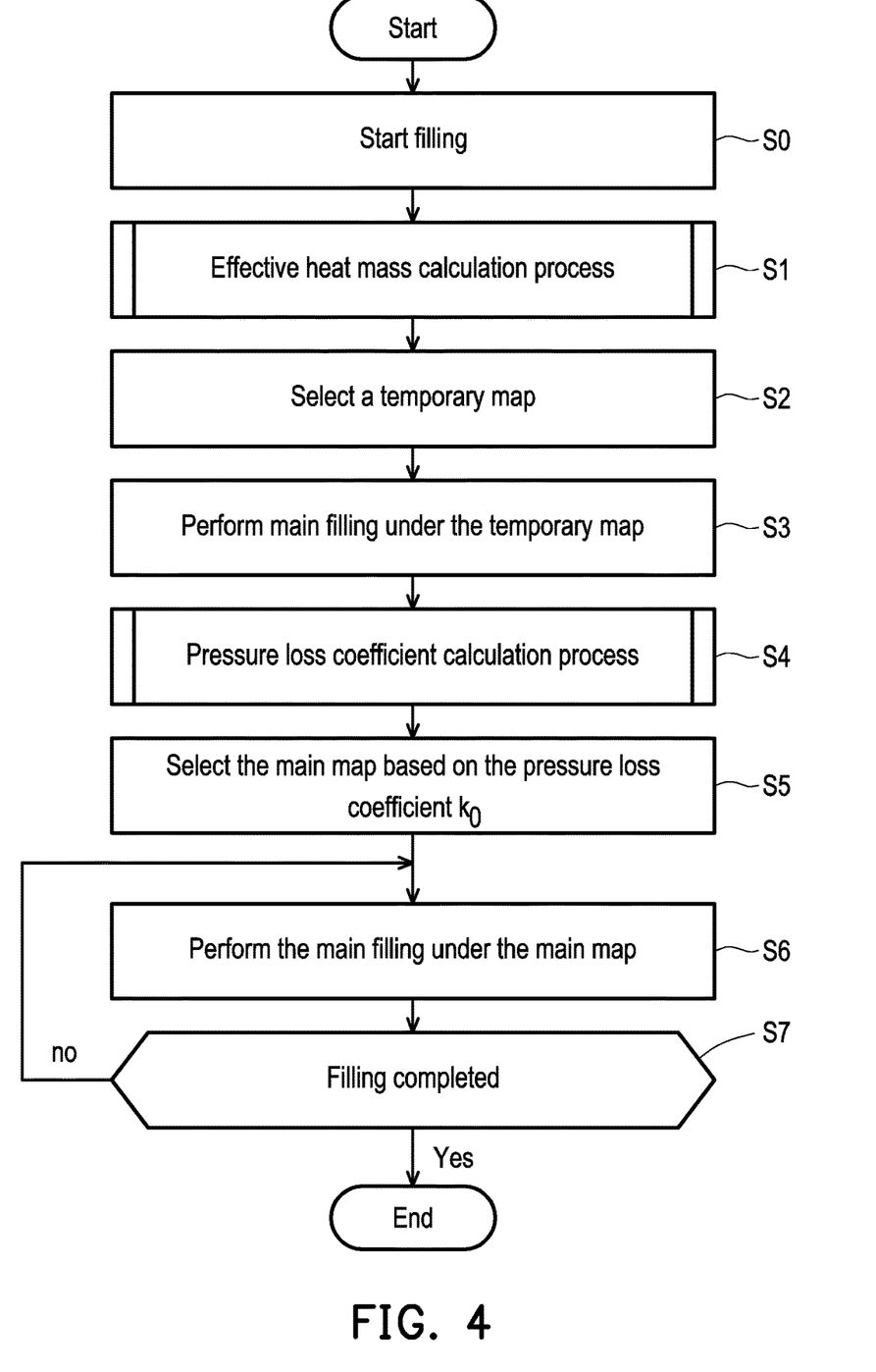
FIG. 4 is a flowchart showing the sequence of filling hydrogen gas in the hydrogen filling system.

FIG. 4 is a flowchart showing the sequence of filling hydrogen gas in the hydrogen filling system S. This process starts correspondingly when the filling nozzle 92 of the hydrogen station 9 is connected to the insertion hole 38 of the vehicle M and turns into a state in which the hydrogen gas may be filled.

In step S0, first, the station ECU 8 executes start of filling. More specifically, in a state where the flow control valve 95 provided in the station piping 93 is tightly closed, the shut-off valve 94 provided on the upstream side thereof is opened, and the pressure in the station piping 93 is increased until the detection value of the station pressure sensor 73 provided on the downstream side of the flow control valve 95 shows a specific value, and then the shut-off valve 94 is closed. As a result, the storage interval from the flow control valve 95 to the shut-off valve 94 in the station piping 93 is filled with hydrogen gas in an amount corresponding to the pressure. Next, the flow control valve 95 is opened with the shut-off valve 94 closed. As a result, the hydrogen gas compressed in the above-mentioned storage interval flows into the hydrogen tank 31 instantaneously, so that the inside of the hydrogen tank 31 and the inside of the station piping 93 become uniform. Then, in step S0, the start of filling is executed as described above, and the time at which the start of filling is started is set as the filling start time $t_{ini}$ required when the filling time $t_{final}$ is determined in the target pressure increase rate setting portion 84 described above, but the present disclosure is not limited thereto.

In step S1, the station ECU 8 proceeds to step S2 to select an appropriate map after the effective heat mass calculation process for calculating the effective heat mass value Heat mass (HM in FIG. 2) is executed by the effective heat mass calculation portion 83.

In step S2, the station ECU 8 acquires the value of the volume V of the hydrogen tank 31 through infrared communication, and selects a temporary map corresponding to the value of the volume V from the predetermined i×j sheets of filling control maps. In order to select an appropriate map as described above, in addition to the value of the volume V, the value of the pressure loss coefficient $k_0$ is required. However, under the circumstances, the station ECU 8 cannot acquire the value of the pressure loss coefficient $k_0$. Therefore, the station ECU 8, as described above, assumes an estimated value greater than the actual value, more specifically, the maximum value in the range expected in the station being used as the value of the pressure loss coefficient $k_0$, and selects the filling control map corresponding to the value of the volume V of the hydrogen tank 31 as the temporary map and sends the temporary map to the pressure increase rate calculation portion 842.

In step S3, the station ECU 8 starts main filling under the filling control map selected as the temporary map in step S2. More specifically, a target pressure increase rate $\Delta P_{ST}$ is set under the temporary map selected in step S2, and hydrogen gas is filled to realize this target pressure increase rate $\Delta P_{ST}$. In addition, in step S3, the detection value of the station temperature sensor cannot be used until a few tens of seconds (for example, 30 seconds) have elapsed after the main filling is started. Therefore, the target pressure increase rate setting portion 84 searches the filling control map based on the predetermined mass average temperature MAT during the period from the start of filling to the elapse of the above-described time, thereby determining the filling time tri and the target pressure increase rate $\Delta P_{ST}$.

In step S4, the station ECU 8 proceeds to step S5 after executing the pressure loss coefficient calculation process for calculating the value of the pressure loss coefficient $k_0$.

Figure 5:
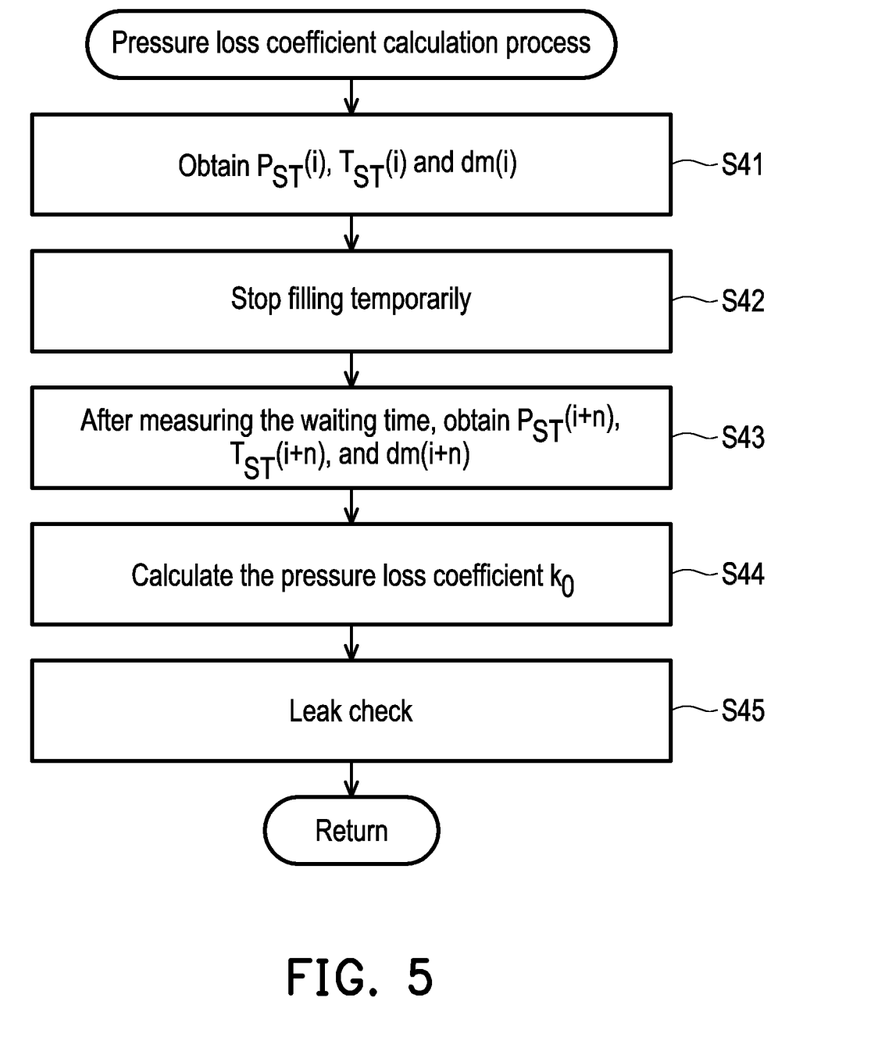
FIG. 5 is a flowchart showing a specific procedure of a pressure loss coefficient calculation process.

FIG. 5 is a flowchart showing a specific procedure of a pressure loss coefficient calculation process.

First, in step S41, the station ECU 8 uses the station pressure sensor 73, the station temperature sensor 72, and the flow rate sensor 71 to acquire the values of the pressure $P_{ST}(i)$, temperature $T_{ST}(i)$ and flow rate dm(i) inside the connecting piping immediately before the filling of hydrogen gas is stopped in step S42 to be described later, and proceed to step S42.

In step S42, the station ECU 8 temporarily stops the filling of hydrogen gas to perform a check for confirming whether or not there is a filling leak, and the process proceeds to step S43. More specifically, the station ECU 8 completely closes the shut-off valve 94, thereby temporarily stopping the filling of hydrogen gas. The following will provide a description of a case where the filling of hydrogen gas is temporarily stopped when the value of the pressure loss coefficient $k_0$ is calculated, that is, a case where the flow rate of the hydrogen gas in the connecting piping is reduced to 0, but the present disclosure is not limited thereto. In this step S42, the filling of hydrogen gas may not be completely stopped. That is, it may be that the flow rate of hydrogen gas is reduced to be close to zero.

In step S43, the station ECU 8 stops the filling of hydrogen gas in step S42 and after a specific measurement waiting time (for example, about 3 seconds) has elapsed, the station ECU 8 uses the station pressure sensor 73 to obtain the value of the pressure $P_{ST}(i+n)$ in the connecting piping from the stop of filling to after the predetermined waiting time has elapsed, and the process proceeds to step S44.

In step S44, the station ECU 8 uses the values of the pressure $P_{ST}(i)$, $P_{ST}(i+n)$, temperature $T_{ST}(i)$ and the flow rate dm(i) obtained before and after the flow rate of the hydrogen gas in the connecting piping is reduced from the flow rate greater than 0 to 0 as described above as well as the above-mentioned equation (5) to calculate the value of the pressure loss coefficient $k_0$, and the process proceeds to step S45.

More specifically, regarding the value of the pressure loss $dP_{loss}$ in the above equation (5), as shown in the following equation (7-1), the calculation is performed by deducting the pressure $P_{ST}(i)$ before the stop of filling from the pressure $P_{ST}(i+n)$ after the stop of filling. Regarding the value of the gas density ρ in the above equation (5), the values of the pressure $P_{ST}(i)$, $P_{ST}(i+n)$ and the temperature $T_{ST}(i)$ are used, and the value calculated by inputting the function of the pressure x and temperature y, that is, the density function ρ[x, y] is also adopted. More specifically, as shown in the following equation (7-2), the value of gas density ρ is calculated by using the average value of the pressure $P_{ST}(i)$ before the flow rate reduction and the pressure $P_{ST}(i+n)$ after the flow rate reduction.

[Equation 7]

$$dP_{loss} = P_{ST}(i) - P_{ST}(i+n) \quad (7\text{-}1)$$

$$k_0 = \frac{\rho\left[(P_{ST}(i) + P_{ST}(i+n))/2,\ T_{ST}(i)\right] * dP_{loss}}{dm(i)^2} \quad (7\text{-}2)$$

In step S45, the station ECU 8 executes a check to confirm whether or not there is a filling leak according to the demand, and then proceeds to step S5 in FIG. 4.

Returning to FIG. 4, in step S5, the station ECU 8 selects, from the plurality of filling control maps, a map corresponding to the value of the pressure loss coefficient $k_0$ calculated in step S4 as the main map, and proceeds to step S6. In step S2 as described above, the station ECU 8 selects a map with the largest pressure loss, that is, the filling control map Mkj, from j sheets of filling control maps (Mk1, ..., Mkj) corresponding to the value of the volume V of the hydrogen tank 31 ("k" is any integer from 1 to i) as a temporary map. Therefore, in step S5, the station ECU 8 selects the map corresponding to the value of the pressure loss coefficient $k_0$ from the j sheets of filling control maps (Mk1, ..., Mkj) as the main map. In this manner, it is possible to select an appropriate filling control map corresponding to the pressure loss of the connecting piping.

In step S6, the station ECU 8 performs the main filling again under the filling control map selected as the main map in step S5. More specifically, a target pressure increase rate $\Delta P_{ST}$ is set under the main map selected in step S5, and hydrogen gas is filled to realize the target pressure increase rate $\Delta P_{ST}$.

In step S7, the station ECU 8 determines whether the filling of the hydrogen gas has been completed, that is, whether the filling of the hydrogen tank 31 has been achieved. The station ECU 8 returns to step S6 when the determining result in step S7 is NO and continues the main filling, and when the determining result is YES, the filling of hydrogen gas is terminated.

Figure 6:
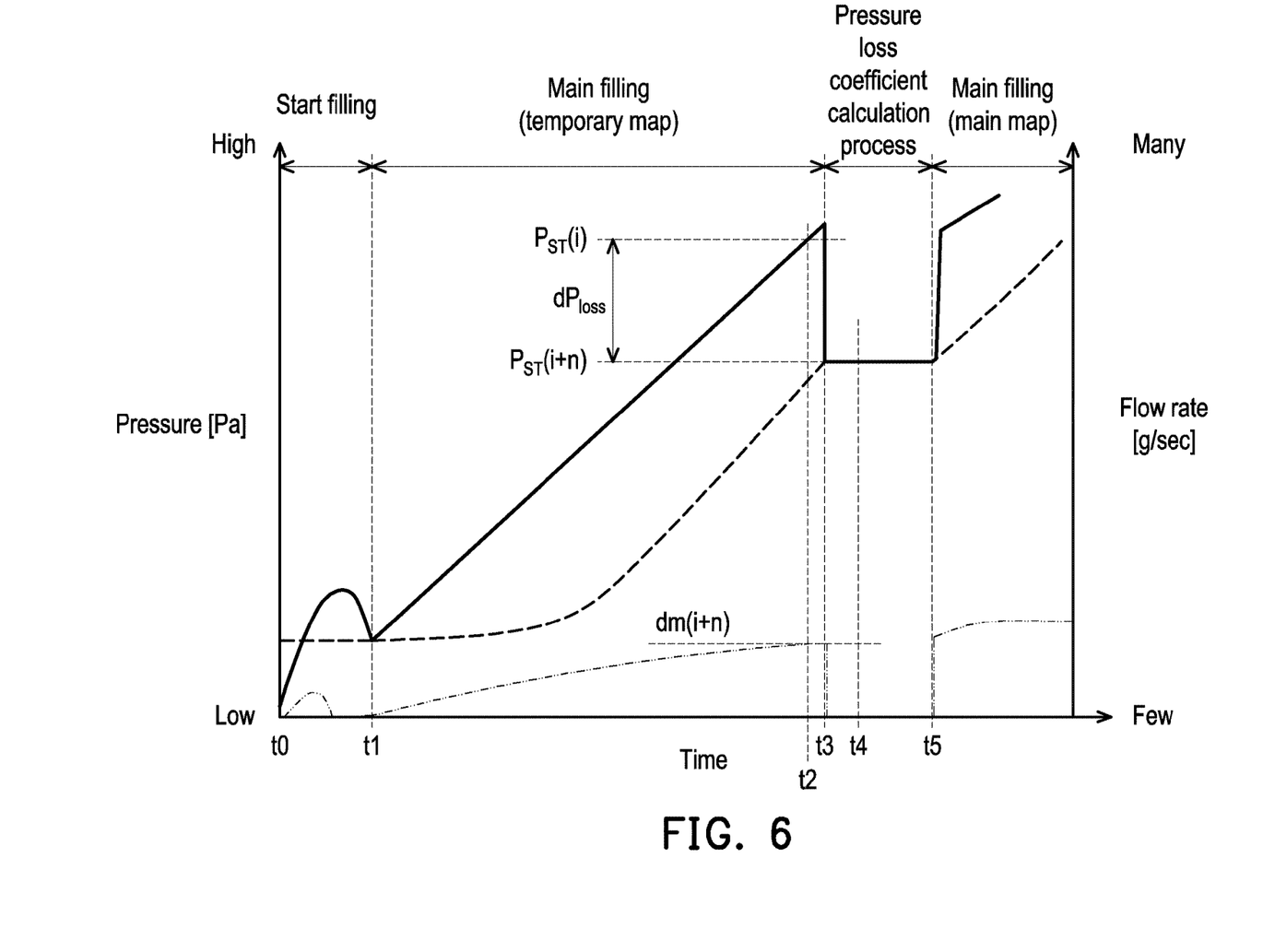
FIG. 6 is a timing chart schematically showing a hydrogen gas filling process realized by the flowchart of FIG. 4.

FIG. 6 is a timing chart schematically showing a hydrogen gas filling process realized by the flowchart of FIG. 4. In FIG. 6, the solid line shows the temporal variation of the pressure detected by the station pressure sensor 73, the dashed line shows the temporal variation of the pressure in the hydrogen tank 31, and the one-dot chain line shows the temporal variation of the flow rate detected by the flow rate sensor 71.

First, the station ECU 8 executes the start of filling from time t0 to t1 (refer to step S1 in FIG. 4, and sets the time t0 at which the pre-injection filling is started as the filling start time $t_{ini}$. Then, at time t1, the station ECU 8 selects a temporary map based on the value of the volume V of the hydrogen tank 31, and during the period from time t1 to t3, main filling is performed under the temporary map. As a result, the pressure in the connecting piping increases at the target pressure increase rate $P_{ST}$ set in the temporary map. In addition, since pressure loss occurs in the connecting piping, during the hydrogen gas flow period from time t1 to t3, the pressure at the detection position of the station pressure sensor 73 in the connecting piping (the part indicated by the solid line in FIG. 6) is higher than the pressure in the hydrogen tank on the downstream side thereof (the part indicated by the dashed line in FIG. 6). The following provides a description for a case in which the time t0 at which the pre-injection filling is started is set as the filling start time $t_{ini}$, but the present disclosure is not limited thereto. After the start of filling is completed, the time t1 at which the main filling is started under the temporary map may be set as the filling start time $t_{ini}$.

Then, the station ECU 8 acquires the values of the pressure $P_{ST}(i)$, the flow rate dm(i), and the temperature $T_{ST}(i)$ in the connecting piping immediately before the filling of hydrogen gas is temporarily stopped at the time t2, and then the filling of hydrogen gas is temporarily stopped at the time t3 to perform leak checks. Then, at time t4, the station ECU 8 acquires the value of the pressure $P_{ST}(i+n)$ in the connecting piping again according to the elapse of the measurement waiting time. The station ECU 8 calculates the value of the pressure loss coefficient $k_0$ by using the pressures $P_{ST}(i)$, $P_{ST}(i+n)$, temperature $T_{ST}(i)$, and flow rate dm(i) acquired before and after the filling of hydrogen gas is temporarily stopped at time t3.

Then, at time t5, the station ECU 8 selects again the filling control map as the main map based on the value of the pressure loss coefficient $k_0$ calculated by the pressure loss coefficient calculation process from time t2 to t5, and performs the main filling again under this main map. In this manner, the filling control map is replaced with an appropriate map corresponding to the state of the connecting piping at this time.

The hydrogen gas filling method of the present embodiment achieves the following effects.

(1) With the hydrogen gas filling method, before starting the filling of the gas and before selecting the temporary map, the piping temperature detected by the gas temperature sensor 72 and the existing set values of the piping (mass of the piping, specific heat capacity, etc.) are adopted to calculate the effective heat mass value Heat mass related to the temporary pressure loss caused by the piping. In the hydrogen gas filling method, the filling control map is changed in consideration of the effective heat mass of the piping system in this way, and an appropriate temporary map is selected, thereby performing the main filling under the temporary map. In this way, the power consumption of a precooler may be reduced. In addition, by increasing the margin of relaxing the set temperature of the precooler, the service life of parts such as piping and piping seals may be prolonged, and the equipment cost may also be reduced by lowering the specifications of the piping and the precooler. After the filling of hydrogen gas is started under the temporary map, the value of the pressure loss coefficient $k_0$ is calculated by using the detection value of the station pressure sensor 73 when the flow rate of hydrogen gas in the connecting piping decreases. In the hydrogen gas filling method, the value of the pressure loss coefficient $k_0$ may be calculated with high accuracy in this way by using the detection value of the station pressure sensor 73 when the flow rate of hydrogen gas decreases. Furthermore, by using the hydrogen gas filling method, the filling control map is changed based on the calculated value of the pressure loss coefficient $k_0$, and the filling of hydrogen gas is continued under the changed filling control map. In the hydrogen gas filling method, by changing the filling control map based on the value of the pressure loss coefficient $k_0$ in this way, the filling control map may be optimized so as to reduce the waste of filling time and the set temperature of the precooler 96, etc., and the gas filling is performed under the optimized filling control map.

(2) The station ECU 8 used in the hydrogen gas filling method selects an appropriate filling control map from a plurality of predetermined maps M11, . . . , Mij, and further operates the flow control valve 95 under the filling conditions defined by the filling control map, thereby controlling the flow rate of hydrogen gas flowing through the connecting piping. In the hydrogen gas filling method, the filling control map selected as temporary map in the station ECU8 is replaced with the filling control map defined by the value of the pressure loss coefficient $k_0$ calculated as described above, thereby changing the filling conditions. In this way, in the hydrogen gas filling method, the filling control map is replaced based on the value of the pressure loss coefficient $k_0$. Therefore, since a plurality of filling control maps predetermined in the station ECU 8 may be optimized according to the value of the pressure loss coefficient $k_0$, the filling time may be shortened as much as possible according to the actual pressure loss, and the set temperature of the precooler 96 may be further increased.

(3) By using the hydrogen gas filling method, and by using the pressure difference $dP_{loss}$ before and after the reduction in the flow rate of hydrogen gas, the gas density ρ in the piping, and the mass flow rate dm of the gas in the connecting piping, it is possible to calculate the value of the pressure loss coefficient $k_0$ defined by the above equation (5). Therefore, by using the hydrogen gas filling method, the value of the pressure loss coefficient $k_0$ may be calculated through a simple calculation.

(4) By using the hydrogen gas filling method, and by using the detection value of the station pressure sensor 73 when the flow rate of the hydrogen gas in the connecting piping decreases from a flow rate greater than 0 to 0 or close to 0, it is possible to calculate the value of the pressure loss coefficient k0. In this way, by using the hydrogen gas filling method, the value of the pressure loss coefficient k0 may be calculated with high accuracy, and the filling control map may be replaced with an appropriate filling control map corresponding to the state of the connecting piping.

An embodiment of the disclosure is described as above, but this disclosure is not limited thereto. The detailed structure may be appropriately changed within the scope to be protected by the present disclosure.

For example, in the above-described embodiment, a more detailed description of the following situation is provided below. That is, after the filling of hydrogen gas is started, the pressure loss coefficient calculation process (refer to FIG. 5) is performed by taking the opportunity of temporarily stopping filling of hydrogen gas to perform a leak check, thereby calculating the values of pressure loss $dP_{loss}$ and the pressure loss coefficient $k_0$. However, the timing for calculating the values of pressure loss $dP_{loss}$ and the pressure loss coefficient $k_0$ is not limited thereto. These timings for calculating the values of the pressure loss $dP_{loss}$ and the pressure loss coefficient $k_0$ may be the time period when the flow rate of the hydrogen gas in the connecting piping is temporarily reduced after the filling of hydrogen gas is started, or the time period when the flow rate of the hydrogen gas in the connecting piping is decreased and then increased. The above timing may be any period for any reason.

For example, the above leak check process is not mandated by regulations in some countries. In such countries, leak checks are also sometimes not carried out during filling of hydrogen gas, so sometimes it is likely to miss the opportunity to calculate the values of the pressure loss $dP_{loss}$ and the pressure loss coefficient $k_0$. However, even if the leak check process is not mandatorily prescribed, for example, during the main filling period, the filling of hydrogen gas may be temporarily stopped to replace the hydrogen tank on a side of the hydrogen station 9. Therefore, in this case, the values of the pressure loss $dP_{loss}$ and the pressure loss coefficient $k_0$ may be calculated using the time when the tank replacement is performed on a side of the hydrogen station 9.

In addition, for example, in the above-mentioned embodiment, a more detailed description of the following situation is provided below. That is, the values of the tank volume V, the pressure loss coefficient $k_0$, and the atmospheric temperature $T_{amb}$ are associated with the values of the four coefficients (a, b, c, d) by using the plurality of filling control maps illustrated in FIG. 3A and FIG. 3B, but the present disclosure is not limited thereto. The values of the tank volume V, the pressure loss coefficient $k_0$, the atmospheric temperature $T_{amb}$ may also be associated with the values of the four coefficients (a, b, c, d) by means of, more specifically, mathematical expressions, neural networks, etc. other than maps.

In summary, in the gas filling method of the present disclosure, in the gas filling system, it is only necessary to use parameters of existing components and parts (for example, existing piping, heat exchangers, and temperature sensors, etc.) to calculate the value of the effective heat mass of the piping system through the existing control device. In this way, the value of the heat mass of the piping is taken into consideration. Moreover, in the step of selecting the temporary map, by selecting a map defined based on the value of the effective heat mass of the piping to perform filling of the gas, it is possible to reduce the power consumption of the precooler. In addition, by increasing the margin of relaxing the set temperature of the precooler, the service life of parts such as piping and piping seals may be prolonged, and the equipment cost may be reduced by lowering the specifications of the piping and the precooler.

Finally, it should be noted that: the above embodiments are only used to illustrate the technical solutions of the present disclosure, but not to limit them; although the present disclosure has been described in detail with reference to the foregoing embodiments, those of ordinary skill in the art should understand that: modification may be made to the technical solutions described in the foregoing embodiments, or some or all of the technical features thereof may be equivalently replaced; and these modifications or replacements do not make the essence of the corresponding technical solutions depart from the scope of the technical solutions of the embodiments of the present disclosure.

What is claimed is:

1. A gas filling method in which a gas filling system is used to fill a tank with a compressed gas from a supply source,
    the gas filling system comprising:
    the supply source in which the compressed gas is stored;
    a piping, connecting the supply source to the tank mounted on a movable body, wherein the piping is provided with a control valve, a pressure sensor, a gas temperature sensor and a flow rate sensor; and
    a control device, operating the control valve in a specific filling condition, and controlling a flow rate of the gas flowing through the piping;
    wherein the gas filling method comprises the following steps:
    an effective heat mass calculation step, which uses a heat capacity of the piping and a detection value of the gas temperature sensor to calculate a value of an effective heat mass related to a temporary pressure loss caused by the piping before gas-filling is started;
    a pressure loss parameter calculation step, which uses a detection value of the pressure sensor when the flow rate of the gas in the piping changes to calculate a value of a pressure loss parameter related to a pressure loss caused by the piping after the gas-filling is started; and
    a filling condition changing step, which changes the filling condition into a condition that is defined based on the value of the pressure loss parameter and the gas-filling is continued.

2. The gas filling method according to claim 1, wherein the control device operates the control valve under a filling condition defined by a filling control map selected from a plurality of predetermined filling control maps, and
    under the filling condition changing step, the filling control map selected by the control device is replaced with a map among the plurality of filling control maps defined based on the value of the pressure loss parameter.

3. The gas filling method according to claim 2, wherein in the pressure loss parameter calculation step, the value of the pressure loss parameter is calculated by using the detection value of the pressure sensor when the flow rate of the gas in the piping decreases from a flow rate greater than 0 to close to 0 or 0.

4. The gas filling method according to claim 1, wherein
    in the pressure loss parameter calculation step, the value of the pressure loss parameter is calculated based on the following equation (1-1),
    in the following equation (1-1), "$k_0$" is the pressure loss parameter, "$dP_{loss}$" is a pressure difference in the piping before and after a reduction in the flow rate of the gas, "$\rho$" is a density of the gas in the piping, and "dm" is a mass flow of the gas in the piping,

[Equation (1-1)]
$$k_0 = \frac{dP_{loss} \cdot \rho}{dm^2}. \qquad (1\text{-}1)$$

5. The gas filling method according to claim 4, wherein in the pressure loss parameter calculation step, the value of the pressure loss parameter is calculated by using the detection value of the pressure sensor when the flow rate of the gas in the piping decreases from a flow rate greater than 0 to close to 0 or 0.

6. The gas filling method according to claim 1, wherein
    the control device operates the control valve under a filling condition defined by a filling control map selected from a plurality of predetermined filling control maps, and,
    under the filling condition changing step, the filling control map selected by the control device is replaced with a map among the plurality of filling control maps defined based on a value of the heat mass related to the temporary pressure loss caused by the piping.

7. The gas filling method according to claim 6, wherein in the pressure loss parameter calculation step, the value of the pressure loss parameter is calculated by using the detection value of the pressure sensor when the flow rate of the gas in the piping decreases from a flow rate greater than 0 to close to 0 or 0.

8. The gas filling method according to claim 1, wherein
    in the effective heat mass calculation step, the value of the effective heat mass is calculated based on the following equation (1-2), in the following equation (1-2), "$T_{tube}$" is a temperature detected by the gas temperature sensor, "$T_{amb}$" is an atmospheric temperature, "$T_{HE}$" is a heat exchanger temperature, "$m_i$" is a mass of the piping, "$Cp_i$" is a specific heat capacity of the piping, and "$m_i \times Cp_i$" is a heat capacity of the piping, and "$k_0$" is the pressure loss parameter,

[Equation (1-2)]

$$\text{Heat mass}_{Real\ time} = \left(\frac{T_{tube} - T_{HE}}{T_{amb} - T_{HE}}\right) \times \sum (m_i \times Cp_i) + f(k_0). \quad (1-2)$$

9. The gas filling method according to claim 8, wherein in the effective heat mass calculation step, the value of the effective heat mass is calculated based on the following equation (1-3), in the following equation (1-3), "$T_{tube}$" is the temperature detected by the gas temperature sensor, "$T_{amb}$" is the atmospheric temperature, "$T_{HE}$" is the heat exchanger temperature, "$m_i$" is the mass of the piping, "$Cp_i$" is the specific heat capacity of the piping, "$m_i \times Cp_i$" is the heat capacity of the piping,

[Equation (1-3)]

$$\text{Heat mass}_{Real\ time} = \left(\frac{T_{tube} - T_{HE}}{T_{amb} - T_{HE}}\right) \times \sum (m_i \times Cp_i). \quad (1-3)$$

10. The gas filling method according to claim 9, wherein in the pressure loss parameter calculation step, the value of the pressure loss parameter is calculated by using the detection value of the pressure sensor when the flow rate of the gas in the piping decreases from a flow rate greater than 0 to close to 0 or 0.

11. The gas filling method according to claim 8, wherein in the pressure loss parameter calculation step, the value of the pressure loss parameter is calculated by using the detection value of the pressure sensor when the flow rate of the gas in the piping decreases from a flow rate greater than 0 to close to 0 or 0.

12. The gas filling method according to claim 1, wherein in the pressure loss parameter calculation step, the value of the pressure loss parameter is calculated by using the detection value of the pressure sensor when the flow rate of the gas in the piping decreases from a flow rate greater than 0 to close to 0 or 0.

* * * * *